United States Patent Office 3,391,999
Patented July 9, 1968

3,391,999
PREPARATION OF METAL ALUMINIDES
Edward L. Cole, Fishkill, and Edwin C. Knowles, Poughkeepsie, N.Y., assignors to Texaco Inc., New York, N.Y., a corporation of Delaware
No Drawing. Filed Aug. 17, 1964, Ser. No. 390,191
14 Claims. (Cl. 23—204)

This invention relates to a method of preparing metal aluminides. In one of its more specific aspects, this invention relates to a method for the preparation of aluminides of metals of Groups IV, VI and VII of the Periodic Table by reacting the metal with metallic aluminum in a molten salt and to the improved product resulting therefrom.

It has been recognized previously that the aluminides have unique and useful properties. For example, titanium aluminide has remarkable strength at high temperatures, exceptional resistance to oxidation, and low density, and is highly resistant to disordering by neutron bombardment. Unfortunately, aluminides prepared by existing processes are very difficult to fabricate. The present invention provides a method of preparing a metal aluminide, e.g., titanium aluminide, in powdered form which may be fabricated by powder metallurgy technique.

Various methods have been proposed for preparing the aluminides. They have been prepared, for example by melting the metals in an arc furnace in an atmosphere of argon or helium. Molten titanium (M.P. 3300° F.) also will react with silica or alumina under high vacuum to form the aluminide. We have discovered, surprisingly, that titanium aluminide may be formed by reacting metallic aluminum with titanium at temperatures as low as 1600° F. Whereas present methods of preparation usually result in a product in lump or slab form which is difficult to fabricate, the present process permits the preparation of the aluminides as fine particles or powders which are readily formed into finished shapes by known techniques employed in the fabrication of metal parts from powdered metals.

An object of this invention is to provide a novel method for the preparation of metal aluminides.

Another object of this invention is to provide a method for preparing metal aluminides in fine particle or powder form.

Still another object of this invention is to provide, as new articles of manufacture, aluminides characterized by a porous structural form.

A further object of this invention is to provide a novel method of producing cermets utilizing metal aluminides.

A still further object of this invention is to provide a method of coating metal surfaces with aluminides.

The present invention relates to a process for the preparation of an aluminide of a metal from Groups IV, VI and VII of the Periodic Table. Aluminides of titanium, zirconium, chromium, uranium, molybdenum, tungsten, and manganese may be prepared by this process. Our invention involves broadly, preparing an aluminide of a metal selected from the group consisting of the metals of Groups IV, VI and VII of the Periodic Table by heating the metal with metallic aluminum in a molten salt. Salts of the alkali metals and the alkaline earth metals, especially the chlorides of sodium, potassium, calcium, magnesium and lithium, are particularly useful in the process of our invention. Alkaline earth metal salts which may be employed in the progress of our invention include, for example, salts of magnesium, calcium, strontium, and barium. Those salts particularly suitable for use in the process are the chlorides, bromides, nitrates and carbonates of the alkali metals and alkaline earth metals. It is necessary to use only a sufficient amount of the salt to submerge the metals. Those salts which are especially preferred are potassium chloride and sodium chloride and mixtures thereof, for example, an equal molar mixture of sodium chloride and potassium chloride.

The general method of preparation of metal aluminides in accordance with this invention involves charging metallic aluminum together with one or more of the metals of Groups IV, VI and VII of the Periodic Table into a ceramic crucible, covering the metals with salt and heating the charge mixture to a temperature above the fusion temperature of the salt. After a suitable reaction period, e.g., 1 to 10 hours, depending upon the charge materials, the crucible is cooled and the resulting aluminide reaction product is freed of salt by washing with a selective solvent for the salt. The salt in which the reaction is carried out is preferably a water-soluble salt, e.g., a chloride, which can be readily removed from the metal aluminide product by washing with water.

Many alkaline earth salts, such as the carbonates, are substantially insoluble or are only slightly soluble in water, but are soluble in aqueous acid solutions and, therefore, may be separated from the metal aluminide by washing the product with a dilute aqueous acid solution. In such cases, an aqueous solution of a mineral acid, for example, nitric acid, hydrochloric acid or sulfuric acid, may be used to dissolve the alkaline earth salts. Also, certain organic acids, such as acetic acid, also may be used satisfactorily. When an acid is used for removal of the salt, the acid should be one which does not react to any appreciable extent with the metal aluminide product.

In carrying out the process of this invention, the amount of aluminum employed is generally dependent upon the molar ratio of the aluminide-forming metal to aluminum desired in the product. For example, aluminides of titanium have been prepared with molar ratios of titanium and aluminum corresponding to TiAl, $TiAl_2$, and $TiAl_3$. It is generally desirable to employ a molar ratio of aluminum to the other metal, i.e., the aluminide-forming metals, of about 1:1 up to about 3:1, although ratios outside of this range may be utilized. A slight excess of aluminum over the stoichiometric amount required for the formation of the desired aluminide product may be employed to assure substantially complete reaction with the aluminide-forming metal.

In a preferred method of carrying out the process of this invention, aluminum metal, suitably in the form of pellets, is placed in a ceramic crucible with an aluminide-forming metal in suitable physical form, e.g., sheet, sponge, wire, pellets, particles or powder, covered with the salt, and heated to a temperature above the melting point of the salt. After a suitable period of time to permit the reaction to proceed to the desired extent, e.g., from 1 to 10 hours, the crucible is cooled and the aluminide recovered from the salt by preferential solution of the salt in water or other suitable solvent. As a specific example, aluminum metal pellets and titanium sponge are permitted to react in a molten salt comprising equal molar amounts of sodium chloride and potassium chloride at a temperature in the range of 1650 to 2000° F. for a period of time within the range of 1–6 hours after which the crucible is cooled, and the product washed with water to recover titanium aluminide in the form of spongy, light-weight aggregates.

The metals and salts may be placed in the reactor in suitable proportions at ambient temperature and then heated to a temperature above the melting point of the salt, suitably in the range of 1650 to 2000° F. It is to be understood that the temperature will depend considerably upon the particular salt employed, since, for example, sodium nitrate has a melting point of about 582° F.

whereas, sodium chloride has a melting point of about 1474° F. and potassium chloride has a melting point of about 1429° F. There is a wide temperature range between the melting point and the boiling point of the salt, so that the temperature can be varied over a rather wide range without vaporization of the molten salt. For example, sodium chloride has a boiling point of about 2575° F. and potassium chloride has a boiling point of about 2732° F. The salt chosen should be one which will not decompose at desired reaction temperatures. Sodium nitrate, for example which decomposes at about 716° F. is generally not suitable for the present process.

The metal aluminide products resulting from the process of the present invention are useful as abrasives, as cermets, and as catalysts supports, especially where high temperature resistance is desired. Uranium aluminides, prepared by the method of this invention may be used as fuels for nuclear power reactors. The products are also useful as heat shields or heat-resistant coatings, e.g., for missiles or spacecraft. The titanium aluminide, TiAl (36 weight percent aluminum) has attracted considerable interest because of its strength at high temperatures, low density and oxidation resistance. As produced in an arc furnace, the ingots cannot be cold forged or pressed, and high energy of deformation is required for hot working even at 1300 to 1400° C. Machinability is poor and machining of the alloy requires carbide-tipped tools. The aluminide powders produced by the process of this invention may be fabricated into shaped pieces by powder metallurgical techniques. By using relatively coarse powders and low pressure, relatively porous shapes can be produced having, for example, a density of about 2.5 grams per cubic centimeter. The porous shapes are useful as filters for high temperature gases, e.g., at 800 to 1000° C. or higher, and as catalyst supports. The aluminides are also useful as cermets.

Heat shields can be produced from the metal aluminide powders, for example, by molding with phenolic resins, phenyl-silane resins, mixtures of phenolic resins and polyethylene, or phenolic resins and low penetration asphalt. Such compositions may be used, for example, for manufacture of nose cones for re-entry heat shields on space vehicles. The powdered metal aluminides, e.g., zirconium aluminide or titanium aluminide, may be used for plating steel surfaces at a high temperature, e.g., by spraying at about 3500° F. or above with a high temperature jet, such as a plasma jet.

Pieces or shaped pellets of metal aluminides can be coated with metal catalyst materials, for example, Group VIII metals, particularly, cobalt and nickel. The pellets may be coated, for example, by chemical reduction of the metals from a solution of their salts by pressuring with hydrogen as disclosed by applicants in U.S. Patent 3,147,154 and described in more detail hereinafter in Examples 20–23. A catalyst comprising nickel on TiAl or ZrAl, is advantageous as a dehydrogenation catalyst due to its exceptional stability under high temperature regeneration conditions. In contrast, catalysts comprising nickel on alumina lose activity during regeneration due to the formation of spinels.

The aluminides prepared by the process of this invention are relatively porous and can be ground to uniform size in suitable grinding equipment, e.g., with a mortar and pestle faced with tungsten carbide. An effective method of powdering the aluminides is to cool to the temperature of Dry Ice and crush by impact, e.g., with a hammer on a steel plate or with a hammer mill. At low temperatures, the intermetallic compounds are very brittle and grinding is not necessary.

In the preparation of the metal aluminides in accordance with the present invention, it is desirable to employ finely divided metals and to ensure intimate mixture of the metals in the reaction mixture. Although pieces of titanium and zirconium one sixteenth of an inch in thickness have been employed successfully in the process, a more consistent product is secured when fine titanium or zirconium sponge is used as the source of these metals. In general, the smaller particle size charge metals result in more nearly pure products of finer particle size than when the charge metals are in lump or strip form.

EXAMPLES 1–3

Titanium sponge and aluminum pellets were subjected to reaction conditions in a ceramic crucible (Coor's porcelain). Equal molar mixtures of sodium chloride and potassium chloride were employed in Examples 1 and 2. In Example 3, no salt was used.

| Example | 1 | 2 | 3 |
|---|---|---|---|
| Charge: | | | |
| Aluminum, g | 3.9 | 0.5 | 4.0 |
| Titanium, g | 4.0 | 4.6 | 4.0 |
| KCl-NaCl, g | 64 | 64 | None |
| Reaction Conditions: | | | |
| Temp., °F | 1,900 | 1,800 | 1,800 |
| Time, hrs | 10 | 10 | 12 |
| Product: X-Ray Analysis | Al$_3$Ti | AlTi$_2$ | (¹) |

¹ No reaction evident.

In each of the above examples, the crucibles were cooled at the end of the reaction period, and the contents freed of potassium chloride and sodium chloride by washing with hot water.

EXAMPLES 4–6

Zirconium strips, vanadium lumps, and chromium powder were reacted with aluminum pellets in a crucible with a molten salt mixture of potasium chloride and sodium chloride in equal molecular quantities.

| Example | 4 | 5 | 6 |
|---|---|---|---|
| Charge: | | | |
| Zirconium, g | 1.8 | | |
| Vanadium, g | | 2.1 | |
| Chromium, g | | | 0.39 |
| Aluminum, g | 2.6 | 2.0 | 0.61 |
| KCl-NaCl, g | 64 | 64 | 64 |
| Reaction Conditions: | | | |
| Temperature, °F | 1,600 | 1,600 | 1,600 |
| Time, hrs | 4 | 4 | 10 |
| Product: X-Ray Analysis | Al$_3$Zr, Al$_2$Zr | ¹ V | AlCr, Al$_2$O$_3$, Cr$_2$O$_3$ |

¹ Unidentified.

It will be noted from Example 5, that no aluminides of vanadium were formed.

EXAMPLES 7–10

The effect of the molar ratio of reactants on the products was investigated in these examples, using equal molecular mixtures of the chlorides of potassium and sodium as the reaction medium.

| Example | 7 | 8 | 9 | 10 |
|---|---|---|---|---|
| Charge, Mole Ratio: | | | | |
| Al/Ti | 1.0 | 3.0 | | |
| Al/Zr | | | 1.0 | 3.0 |
| Reaction Temp., °F | 2,000 | 1,800 | 1,800 | 1,800 |
| Reaction Time, hrs | 8 | 10 | 10 | 10 |
| Product: X-Ray Analysis | ¹ AlTi | Al$_3$Ti | Al$_2$Zr, Al$_3$Zr | Al$_3$Zr |

¹ Some unidentified.

EXAMPLES 11–12

The effect of relative proportions of the metal reactants on the product was further investigated using the theoretical amounts necessary to prepare pure compounds. In these runs, titanium sponge was reacted with aluminum pellets at 1800° F. for 10 hours in the presence of an equal molar mixture of potassium chloride and sodium chloride.

| Example | 11 | 12 |
|---|---|---|
| Charge: | | |
| Aluminum, wt. percent | 35.8 | 63.9 |
| Titanium, wt. percent | 64.2 | 36.1 |
| Product Analysis: X-Ray | AlTi [1] Ti | Al₃Ti |
| Analytical: | | |
| Al, wt. percent | 37.1 | 61.5 |
| Ti, wt. percent | 61.7 | 41.2 |
| Total | 98.8 | 102.7 |

[1] Trace.

The data reported in Examples 7–12 above, show that aluminides having a high ratio of aluminum can be prepared in nearly pure form. Some contamination occurred in the product when equal molar compounds were prepared.

The powdered products appear porous when examined under a microscope with 40× magnification.

EXAMPLES 13–15

To determine the feasibility of producing shaped pieces by powder metallurgy techniques, Al₃Ti and AlTi products obtained by the process of this invention were powdered to pass a 100 mesh screen using a tungsten carbide faced mortar and pestle. The powders mixed with a stearate lubricant were compressed into cylinders about ¼ inch by ¼ inch in a hand press capable of exerting a pressure of about 1500 p.s.i. on the pellets. The pellets could be handled quite readily without disintegration. Several of the pellets (A) were heated in an induction furnace in a atmosphere of nitrogen for 5 minutes at 1000° F. and others (B) were heated in air for 30 minutes at 1800° F. Physical properties of the pellets are shown below:

| Example | 13 | 14 | 15 |
|---|---|---|---|
| Compound | Al₃Ti | Al₃Ti | AlTi. |
| Heat Treatment | A | B | B. |
| Color | Shiny, dark grey. | Dull grey | Blue grey. |
| Density, g./cc.: | | | |
| Before heating | 2.50 | 2.67 | 2.64. |
| After heating | | 2.70 | 2.81. |
| Resistivity, ohms/cm.² | >10⁴ | >10⁴ | ~10⁴. |
| Crushing Strength, lbs. | >30 | >30 | >30. |

The pressed shapes or pellets are quite porous and are suitable as catalyst bases, filters for high temperature gases and heat shields.

EXAMPLE 16

A pellet of TiAl₃ was heated in a flame on silica cloth having a melting point of approximately 3000° F. The cloth melted while the pellet remained intact. The pellet was cooled fairly rapidly without cracking and there was no change in appearance as a result of the heating and cooling cycle. In an oxy-acetylene flame, at a temperature of about 4000° F., the pellet starting to melt. After cooling, that portion of the pellet facing the flame showed signs of oxidation.

EXAMPLES 17–18

Surface area measurements were made with titanium aluminide powders.

| Example | 17 | 18 |
|---|---|---|
| Compound | AlTi | Al₃Ti |
| BET, sq. m./g. | 10 | 5 |

In the form produced, it appears that the powders have relatively low surface area.

EXAMPLE 19

Titanium metal was plated with TiAl₃ by placing a piece of titanium sheet into a crucible with aluminum pellets, potassium chloride and sodium chloride.

Charge:
  Aluminum, g. — 0.5
  Titanium, g. — 0.87
  Potassium chloride, g. — 36
  Sodium chloride, g. — 23
Reaction conditions:
  Temperature, ° F. — 1600
  Time, hrs. — 10
Coating:
  X-ray analysis — TiAl₃
  Appearance — Silver plated
  Amount, mg./in.² — 398

A number of runs were made to demonstrate the utility of the aluminides as catalyst bases. These data are summarized in Examples 20–23.

EXAMPLE 20

A catalyst comprising palladium on HF-treated TiAl was prepared and tested for dehydrogenation. The catalyst base was prepared by reacting titanium sponge with aluminum pellets in an equal molar mixture of sodium chloride and potassium chloride at 1800° F. for 10 hours. The product of reaction was cooled and the salt removed from the TiAl by boiling in water. A 25 gram batch of the resulting titanium aluminide particles was treated with 50 ml. of 0.5 percent HF solution for about 30 seconds. The acid treated product was washed with distilled water and dried. One gram of palladium chloride (PdCl₂) was dissolved in 50 ml. absolute alcohol and the solution poured over the particles and evaporated to dryness.

The resulting catalyst material was in particle form ranging from 1/32 to 1/16 inch in cross section and had a volume of 28 ml. The catalyst was placed in a stainless steel tube 0.4 ID and the tube placed in a furnace, and purged first with nitrogen and finally with hydrogen. With hydrogen flowing through the catalyst, the temperature was raised to 400° F. and held for 3 hours. The temperature was then raised to 690° F. and tetralin fed to the catalyst at the rate of 10 to 15 ml./hr. A small amount of hydrogen was supplied to the catalyst during the run period of about 2 hours during which 21.7 ml. of tetralin was passed through the catalyst bed. Data are summarized below:

Reaction — Dehydrogenation.
Catalyst — Pd/AlTi·HF.*
Charge — Tetralin-H₂
Process conditions:
  Equipment — Packed bed.
  Temp., ° F. — 700–708.
  Pressure — Atmospheric.
  Contact time, sec. — 25.
Product — Napthalene.
  Conversion, wt. percent — 12.
  Selectivity, wt. percent — 100.

*Coarse particles.

EXAMPLE 21

TiAl₃ was prepared from aluminum pellets and titanium sponge by reaction at 1800° F. for 10 hours in a molten salt bath comprising equal molar amounts of potassium chloride and sodium chloride. Twenty five grams of the resulting TiAl₃ was divided into equal portions, one of which was powdered to −300 mesh while the remainder was ground to −100 mesh. The pulverized particles mixed with one another and with 3 percent hydrogenated vegetable fat as a lubricant and pressed into cylindrical pellets about ¼″ to ¼″. The pellets were sintered in a muffle furnace for ½ hour at 1000° F. One gram of chloroplatinic acid (H₂PtCl₆·6H₂O) in 35 ml. absolute ethanol was poured over the pellets and evaporated to dryness. The pellets were packed in a one inch ID glass tube, the tube placed in the furnace, the unit flushed with nitrogen, and then hydrogen was passed through the tube at the rate of 20 ml. per minute. The temperature was raised to 500° F. and held for 16 hours. Ethylene was fed at the rate of 10 ml. per minute with hydrogen at the rate of 20 ml. per minute. A summary of the operating conditions and results is shown below:

| | |
|---|---|
| Reaction | Hydrogenation. |
| Catalyst | Pt/Al$_3$Ti.* |
| Charge | Ethylene-H$_2$. |
| Process conditions: | |
|     Equipment | Packed bed. |
|     Temp., ° F. | 153–163. |
|     Pressure | Atmospheric. |
|     Contact time, sec. | 37. |
| Product | Ethane. |
|     Conversion, wt. percent | 100. |
|     Selectivity, wt. percent | 100. |

*Compacted and heated pellets.

EXAMPLE 22

Twenty grams of TiAl$_3$ having an average particle size 1/16 inch in cross section, was treated with a solution of 5 grams ammonium molybdate in 10 ml. of water. The water was evaporated and the catalyst material dried at 300° F. The dried catalyst weighed 24.4 grams and had a volume of 18 ml. The catalyst was placed in a 0.37" ID stainless steel tube forming a bed 8½" deep. The tube was placed in a radiant furnace and, with air passing through the catalyst tube at the rate of 3.5 cubic feet per hour, the temperature was raised to 710° F. and the tube held at this temperature for 2 hours. Methanol was passed through the catalyst bed with air at the rate of 13.1 grams per hour so that the total gas flow (methanol and air) through the catalyst was about 14,100 v./v./hr. Results are summarized in the following table:

| | |
|---|---|
| Reaction | Oxidation. |
| Catalyst | MoO$_3$/Al$_3$Ti.* |
| Charge | Methanol-air. |
| Process conditions: | |
|     Equipment | Packed bed. |
|     Temp., ° F. | 726 (average). |
|     Pressure | Atmospheric. |
|     Contact time, sec. | 0.26. |
| Product | Formaldehyde. |
|     Conversion, wt. percent | 6. |
|     Selectivity, wt. percent | 87. |

*Coarse particles.

EXAMPLE 23

TiAl$_3$ was prepared by reacting titanium sponge with aluminum pellets at 1600° F. for 7 hours in an equal molar mixture of sodium chloride and potassium chloride. Fifty grams of the product TiAl$_3$ was used for the preparation of a nickel-tungsten sulfide catalyst. Ten grams of nickel nitrate, (Ni(NO$_3$)$_2$·6H$_2$O) were added to 5 ml. ammonium hydroxide (28%) in 10 ml. of water. Six grams tungstic acid were slurried in 8 ml. ammonium hydroxide (28%) in 10 ml. of water. The two solutions were mixed and added to the TiAl$_3$ particles and evaporated to dryness. The resulting catalyst, weighing 62.87 grams was placed in a tube furnace, purged with nitrogen, and then heated for 5 hours in a slow stream of hydrogen and hydrogen sulfide to 500° F., held at 500° F. for 5 additional hours, cooled, and flushed with hydrogen. Fifty seven and one half grams of the resulting catalyst was placed in a 2500 ml. autoclave with 500 grams of wax distillate 20 having the following properties:

| | |
|---|---|
| Gravity, ° API | 23.1 |
| Flash, COC ° F. | 460 |
| Fire, COC ° F. | 520 |
| Kinematic viscosity: | |
|     150° F., cs. | 25.3 |
|     210° F., cs. | 9.08 |
| Carbon residue, wt. percent | 0.15 |
| Sulfur, wt. percent | 1.51 |
| Color Lovibond ½" | Too dark |

The autoclave was flushed with hydrogen, pressured to 1000 p.s.i.g. and run for 48 hours at 600° F. and 1000 p.s.i.g. The color of the product was improved to give a Lovibond of 50 with the ½ inch cell. Sulfur and carbon residue were reduced. The results are summarized in the following table:

| | |
|---|---|
| Reaction | Desulfurization-hydrogenation. |
| Catalyst | NiWS/Al$_3$Ti.* |
| Charge | Wax distillate 20-H$_2$; 1.51% S, 0.15 carbon res. |
| Process conditions: | |
|     Equipment | Batch autoclave. |
|     Temp., ° F. | 600. |
|     Pressure, p.s.i.g. | 1000. |
|     Contact time | 48 hours. |
| Product | Desulfurized product. |
|     Sulfur reduction | 54% desulfurization. |
|     Carbon residue | 48% carbon residue reduction. |

*Coarse particles.

We claim:
1. A method of preparing a metal aluminide of a metal from Groups IV, VI, and VII of the Periodic Table which comprises reacting said metal with metallic aluminum in a heat stable, molten salt of a metal selected from the group consisting of alkali metals and alkaline earth metals at a temperature above the fusion temperature of the salt.

2. A method according to claim 1 wherein said metal is titanium.

3. A method according to claim 1 wherein said metal is zirconium.

4. A method for preparing a metal aluminide as defined in claim 1 wherein said reaction is carried out at a temperature in the range of 1600 to 2000° F.

5. A method according to claim 4 wherein the reaction is carried out in a period of 1 to 10 hours.

6. A method as defined in claim 1 wherein said metal salt is a metal chloride.

7. A method as defined in claim 1 wherein said molten salt is a mixture of the chlorides of sodium and potassium.

8. A method of preparing a metal aluminide which comprises heating metallic aluminum and an aluminide-forming metal from Groups IV, VI and VII of the Periodic Table in the presence of a heat stable salt of a metal selected from the group consisting of alkali metals and alkaline earth metals at a temperature above the fusion temperature of the salt for a period of time effecting reaction of said metals to metal aluminide, cooling the resulting mixture thereby solidifying said salt, and recovering metal aluminide product of reaction therefrom by dissolving said salt and separating the solution from the solid metal aluminide.

9. A process according to claim 8 in which the salt is a water-soluble salt and the metal aluminide is recovered from the solidified salt by dissolving the salt in water.

10. A method according to claim 8 in which the aluminide-forming metal is titanium and the salt is a mixture of sodium chloride and potassium chloride.

11. A method according to claim 8 in which the aluminide-forming metal is zirconium and the salt is a mixture of sodium chloride and potassium chloride.

12. A method of forming an adherent metal aluminide coating on the surface of a metal of Groups IV, VI, and VII of the Periodic Table which comprises contacting the surface of said metal with a heat stable salt of a metal selected from the group consisting of alkali metals and alkaline earth metals at a temperature above the fusion temperature of the salt in the presence of metallic aluminum for a period of time effective for the production of a coating of an aluminide of said metal on its surface.

13. A catalytic structure comprising a metal aluminide support in particle form prepared by immersing an aluminide-forming metal from Groups IV, VI, and VII of the Periodic Table with metallic aluminum in a heat stable, molten salt of a metal selected from the group consisting of alkali metals and alkaline earth metals for a period of time within the range of 1 to 10 hours, and a metal catalyst material of a metal selected from the group consisting of Group VIII metals, molybdenum and tungsten deposited on the surface of the resulting metal aluminide.

14. A catalytic structure as defined in claim 13 wherein the metal aluminide is a titanium aluminide.

References Cited

UNITED STATES PATENTS

| | | | |
|---|---|---|---|
| 2,781,261 | 2/1957 | Kamlet | 75—138 |
| 2,931,722 | 4/1960 | Urban | 75—175.5 |

FOREIGN PATENTS

| | | |
|---|---|---|
| 955,730 | 4/1964 | Great Britain. |

OSCAR R. VERTIZ, *Primary Examiner.*

H. S. MILLER, *Assistant Examiner.*